United States Patent
Kühne

(10) Patent No.: US 11,975,607 B2
(45) Date of Patent: May 7, 2024

(54) METHOD AND A DISPLAY DEVICE FOR VISUALISING AN ARRANGEMENT AND METHOD OF OPERATION OF SURROUNDINGS SENSORS OF A MOTOR VEHICLE

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 644 days.

(21) Appl. No.: 17/267,393

(22) PCT Filed: May 21, 2019

(86) PCT No.: PCT/EP2019/063015
§ 371 (c)(1),
(2) Date: Feb. 9, 2021

(87) PCT Pub. No.: WO2020/030313
PCT Pub. Date: Feb. 13, 2020

(65) Prior Publication Data
US 2021/0291659 A1     Sep. 23, 2021

(30) Foreign Application Priority Data

Aug. 10, 2018 (DE) ............... 10 2018 213 554.1

(51) Int. Cl.
*B60K 35/85* (2024.01)
*B60K 35/00* (2006.01)
(Continued)

(52) U.S. Cl.
CPC ............ *B60K 35/00* (2013.01); *G01S 7/04* (2013.01); *G01S 13/931* (2013.01); *B60K 35/28* (2024.01);
(Continued)

(58) Field of Classification Search
CPC .......... G01S 13/931; G01S 7/04; G01S 13/00; B60K 35/00; B60K 2370/5911;
(Continued)

(56) References Cited

U.S. PATENT DOCUMENTS 10,152,771 B1 * 12/2018 Li ..................... G06V 20/56
10,540,892 B1 *  1/2020 Fields ................. G07C 5/0841
(Continued)

FOREIGN PATENT DOCUMENTS

CN    103171439 A    6/2013
CN    105593104 A    5/2016
(Continued)

OTHER PUBLICATIONS

Zanchin et al., On the instrumentation and classification of autonomous cars, 2017, IEEE, p. 2631-2636 (Year: 2017).*
(Continued)

*Primary Examiner* — McDieunel Marc
(74) *Attorney, Agent, or Firm* — STAAS & HALSEY LLP

(57) ABSTRACT

During an at least partially autonomous driving operation of a motor vehicle, an arrangement and mode of action of environmental sensors of the motor vehicle, the sensor data of which are used in the at least partially autonomous driving operation, is visualized by use of a display device arranged in the motor vehicle. The motor vehicle includes a data interface for wirelessly transmitting data to the display device.

18 Claims, 1 Drawing Sheet

(51) Int. Cl.
*G01S 7/04* (2006.01)
*G01S 13/931* (2020.01)
*B60K 35/28* (2024.01)

(52) U.S. Cl.
CPC ........ *B60K 35/85* (2024.01); *B60K 2360/165* (2024.01); *B60K 2360/167* (2024.01); *B60K 2360/171* (2024.01); *B60K 2360/172* (2024.01); *B60K 2360/175* (2024.01); *B60K 2360/177* (2024.01); *B60K 2360/48* (2024.01); *B60K 2360/5911* (2024.01); *B60K 2360/5915* (2024.01)

(58) Field of Classification Search
CPC ........ B60K 2370/172; B60K 2370/175; B60K 2370/165; B60K 2370/5915; B60K 2370/589; B60K 2370/48; B60K 2370/171; B60K 2370/167; B60K 2370/177

See application file for complete search history.

(56) References Cited

U.S. PATENT DOCUMENTS

| | | | | |
|---|---|---|---|---|
| 10,740,975 | B2 * | 8/2020 | Wu | G06T 19/006 |
| 10,742,399 | B2 * | 8/2020 | Chen | G06V 40/161 |
| 10,754,418 | B1 * | 8/2020 | Ruppert | G06T 7/70 |
| 10,766,498 | B2 * | 9/2020 | Kleen | G08G 1/166 |
| 10,773,169 | B2 * | 9/2020 | Leeper | G06V 20/20 |
| 10,843,689 | B2 * | 11/2020 | Jiang | G08G 1/166 |
| 2004/0105573 | A1 * | 6/2004 | Neumann | G06T 17/00 382/103 |
| 2004/0179104 | A1 * | 9/2004 | Benton | G01C 21/20 348/207.99 |
| 2017/0076606 | A1 | 3/2017 | Gupta et al. | |
| 2017/0129426 | A1 | 5/2017 | Smith et al. | |
| 2020/0055356 | A1 * | 2/2020 | Niewiadomski | B60R 1/003 |

FOREIGN PATENT DOCUMENTS

| | | |
|---|---|---|
| CN | 106536316 A | 3/2017 |
| CN | 107428252 A | 12/2017 |
| DE | 196 25 435 A1 | 1/1998 |
| DE | 10 2008 019 461 A1 | 10/2009 |
| DE | 10 2008 036 009 A1 | 10/2009 |
| DE | 10 2011 083 770 A1 | 4/2013 |
| DE | 10 2011 121 948 A1 | 6/2013 |
| DE | 10 2013 021 853 A1 | 6/2015 |
| DE | 10 2014 214 506 A1 | 1/2016 |
| DE | 10 2015 103 773 A1 | 9/2016 |
| DE | 10 2016 210 611 A1 | 12/2017 |
| DE | 10 2016 211 646 A1 | 12/2017 |
| DE | 10 2016 214 916 A1 | 2/2018 |

OTHER PUBLICATIONS

Bécsi et al., Educational Frameworks for Vehicle Mechatronics, 2015, IEEE, p. 3534-3542 (Year: 2015).*
Wei et al., Towards a viable autonomous driving research platform, 2013, IEEE, p. 763-770 (Year: 2013).*
Florentine et al., Self-driving vehicle acknowledgement of pedestrian presence conveyed via Light-Emitting Diodes, 2015, IEEE, p. 1-6 (Year: 2015).*
International Search Report (Forms PCT/ISA/210; PCT/ISA/220; and PCT/ISA/237); dated Aug. 19, 2019, in International Patent Application No. PCT/EP2019/063015 (15 pages).
Written Opinion (Form PCT/IPEA/408); dated Mar. 23, 2020, in International Patent Application No. PCT/EP2019/063015 (6 pages).
International Preliminary Report on Patentability (Forms PCT/IPEA/409; PCT/IPEA/416); dated May 11, 2020, in International Patent Application No. PCT/EP2019/063015, including Transmittal Letter and Amended Claims (11 pages).
Examination Report dated May 22, 2019, in German Patent Application No. 10 2018 213 554.1 (10 pages).
International Patent Application No. PCT/EP/2019/063015, filed May 21, 2019, Marcus Kühne, Audi AG.
German Patent Application No. 10 2018 213 554.1, filed Aug. 10, 2018, Marcus Kühne, Audi AG.
International Preliminary Report on Patentability (Forms PCT/IPEA/409; PCT/IPEA/416); dated May 11, 2020, in International Patent Application No. PCT/EP2019/063015, including Transmittal Letter and Amended Claims (17 pages).
Notification of Transmittal of the International Preliminary Report on Patentability (Form PCT/IB/338); dated Feb. 11, 2021 in International Patent Application No. PCT/EP2019/063015 (1 page).
European Search Report issued in European Application No. 23152298.8 dated Apr. 14, 2023.
German Office Action issued in German Application No. 10 2018 213 554.1 dated Oct. 20, 2023.
Chinese Office Action issued in Chinese Application No. 201980053081.2 dated Oct. 18, 2023.

* cited by examiner

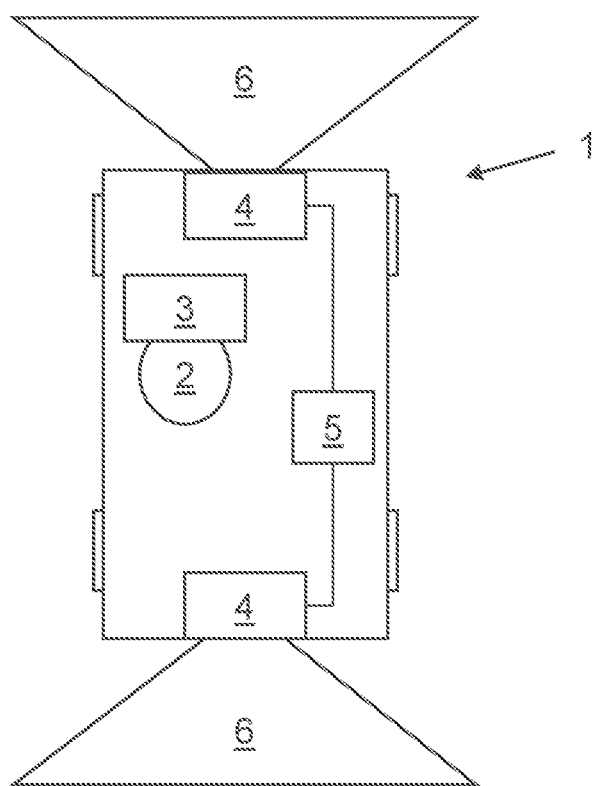

METHOD AND A DISPLAY DEVICE FOR VISUALISING AN ARRANGEMENT AND METHOD OF OPERATION OF SURROUNDINGS SENSORS OF A MOTOR VEHICLE

CROSS-REFERENCE TO RELATED APPLICATIONS

This application is a U.S. national stage of International Application No. PCT/EP2019/063015, filed on May 21, 2019. The International Application claims the priority benefit of German Application No. 10 2018 213 554.1 filed on Aug. 10, 2018. Both the International Application and the German Application are incorporated by reference herein in their entirety.

BACKGROUND

Described herein is a method and a display device for visualizing an arrangement and mode of action of environmental sensors of a motor vehicle. Furthermore, described herein is a motor vehicle.

With the increasing use of autonomous driving options in motor vehicles, it will become very important to make apparent the functionality of autonomous vehicles and the resulting high level of reliability.

German Patent Application No. 10 2016 214 916 A1 describes a method for operating a motor vehicle, in which the motor vehicle drives autonomously and in which a maneuver which is presently carried out by the motor vehicle or imminent is displayed on a display of the motor vehicle. Sensory capabilities of the motor vehicle can be depicted visibly for a driver by use of a display in this case.

German Patent Application No. 10 2013 021 853 A1 describes a device and a method for operating an autopilot of a vehicle. Data glasses arranged outside the vehicle are used to display sensor data of the vehicle when an error occurs during an autonomous driving maneuver of the vehicle.

German Patent Application No. 10 2011 121 948 A1 describes a method in which a preview of actions of an autonomous driving system is given. A display of a vehicle is used to display a planned autonomous driving maneuver of the vehicle.

SUMMARY

Described herein is a solution by use of which a mode of action of an at least partially autonomously driving vehicle can be visualized in a particularly easily comprehensible manner.

This may be achieved by a method for operating a motor vehicle and by a display device having the features described herein. Advantageous embodiments having expedient and nontrivial refinements are further described herein.

In the method described herein for operating a motor vehicle, during at least partially autonomous driving operation of the motor vehicle, an arrangement and mode of action (method of operation) of environmental sensors (surrounding sensors) of the motor vehicle, the sensor data of which are used in the at least partially autonomous driving operation, are visualized by use of at least one display device arranged in the motor vehicle. Partially autonomous driving operation means that the motor vehicle acts autonomously at least with respect to the longitudinal guidance or the lateral guidance, without a driver having to engage in a controlling manner themselves in this regard. However, it is also possible in the method described herein that in fully autonomous driving operation of the motor vehicle, i.e., in driving operation in which a driver does not engage in the longitudinal guidance or in the lateral guidance, the arrangement and mode of action of the environmental sensors of the motor vehicle are visualized by use of the display device arranged in the motor vehicle.

The method and display device described herein are based on the finding here that it will become very important with increasing use of autonomous driving to make apparent the mode of action of autonomously driving vehicles and the high level of reliability resulting therefrom to customers, coworkers, and also public persons, such as journalists. Because both the arrangement and also the mode of action of the environmental sensors of the motor vehicle, the sensor data of which are used in the at least partially autonomous driving operation, are visualized by use of the display device arranged in the motor vehicle, a particularly high level of acceptance for the partially autonomous driving operation or also for fully autonomous driving operation can be provided in vehicle occupants of the motor vehicle. A spatially correct arrangement of the environmental sensors of the motor vehicle is thus visualized, so that a vehicle occupant can recognize where the environmental sensors of the motor vehicle are arranged. Since the mode of action of these environmental sensors is also visualized, the vehicle occupant can recognize in a simple manner what the motor vehicle detects of its environment. It is thus also possible to convey by use of the display device how the motor vehicle processes the sensor data in the at least partially autonomous driving operation or also in the fully autonomous driving operation and converts the data into the partially autonomous or fully autonomous driving movements. For this purpose, it is provided that a permanent communication or a data exchange takes place between the relevant display device and the motor vehicle, for example via a suitable interface, for example in the form of Bluetooth or the like.

One advantageous embodiment described herein provides that the display device includes augmented reality glasses, an augmented reality contact lens, virtual reality glasses, or a display device of the motor vehicle, for example a contact-analog display device. It is possible by use of augmented reality glasses that the vehicle occupant still perceives his environment, wherein items of information on the arrangement and mode of action of the environmental sensors are easily overlaid. For example, if the vehicle occupant looks forward while wearing augmented reality glasses, the augmented reality glasses thus indicate, for example, a sensor arranged in the front region of the motor vehicle as an icon or the like. Moreover, the augmented reality glasses can also visualize the mode of action of the relevant sensor by corresponding overlay of the reality with virtual content. If the vehicle occupant turns his head to the left, for example, while wearing augmented reality glasses, he thus again sees, for example, an icon or the like, which identifies a sensor and its positioning, which is arranged laterally on the motor vehicle in order to monitor the vehicle environment to the side. The same thing can also be carried out using an augmented reality contact lens or a contact-analog display device. The contact-analog display device can be, for example, a head-up display or also display devices integrated in respective windows of the motor vehicle. It is thus possible by use of the augmented reality glasses, the augmented reality contact lens, and the contact-analog display devices that the relevant vehicle occupant still perceives his real environment, wherein the arrangement and mode of action of the environmental sensors of the motor vehicle can be visualized as an overlay of the reality by use of these display devices. It is also possible that the vehicle occupant, for example if it is a front passenger and not the driver, has put on virtual reality glasses, wherein the arrangement and mode of action of the environmental sensors of the motor vehicle are visualized by use of these glasses.

A further advantageous embodiment described herein provides that a respective positioning of the environmental sensors on the motor vehicle is indicated and their respective detection ranges are visualized by use of the display device. A vehicle occupant can thus recognize very easily where the respective environmental sensors of the motor vehicle are arranged and which detection range they can cover at all. For example, if the detection ranges are relatively large, this can contribute to the vehicle occupant being particularly calmed if the motor vehicle drives partially autonomously or autonomously, since the vehicle occupant has it displayed how much the motor vehicle can actually sensorially recognize of its environment.

According to a further advantageous embodiment described herein, it is provided that a respective sensor action principle of the environmental sensors is visualized by use of the display device. The vehicle occupant can thus recognize in a simple manner whether the respective environmental sensors are, for example, cameras, lidar sensors, radar sensors, infrared sensors, and the like. This can be carried out, for example, by overlaying suitable symbols corresponding to the respective sensor action principle at the point where the respective environmental sensor is actually arranged. The vehicle occupant can thus comprehend particularly easily which sensor action principle the respective environmental sensors are based on, which can also contribute to the vehicle occupant accepting the partially autonomous or also fully autonomous driving operation of the motor vehicle particularly well.

In a further advantageous embodiment described herein, it is provided that if at least one of the environmental sensors is a radar sensor, respective radar waves are visualized by use of the display device. For example, it is also possible that the radar waves which are reflected back to the radar sensor from a vehicle-external object are visualized by use of the display device. In the case of one or more radar sensors for environmental recognition, the vehicle occupant can thus recognize both a field of view of the relevant sensors and also an interaction with the environment in the form of the returned or reflected radar waves. The mode of action of the relevant environmental sensors can thus be understood particularly well by the vehicle occupant. Very generally, it is possible, independently of the respective type of the environmental sensor, to convey a respective mode of action of the environmental sensor, for example with the aid of continuing animations in an exterior region of the motor vehicle, so that the vehicle occupant can recognize how respective sensor data are processed and converted into a driving movement in the partially autonomous or fully autonomous driving operation.

A further advantageous embodiment described herein provides that the visualization of the arrangement and mode of action of the environmental sensors of the motor vehicle is started automatically as soon as the motor vehicle changes from a manual driving mode into an at least partially autonomous driving mode. As soon as a driver thus no longer completely controls the motor vehicle himself, whether it is the longitudinal control and/or the lateral control, the visualization of the arrangement and mode of action of the environmental sensors thus starts. A particularly safe feeling is thus conveyed to the driver and possibly also further vehicle occupants, since the vehicle occupants can recognize directly how the environmental sensors of the motor vehicle are arranged and act when the motor vehicle is no longer manually controlled. Of course, it is also possible to suppress the automatic starting of this visualization, for example via a corresponding menu in an infotainment system of the motor vehicle, so that a vehicle occupant can select whether or not he wishes the automatic starting of the visualization of the arrangement and mode of action of the environmental sensors.

The display device described herein is arrangeable in a motor vehicle and is configured to visualize an arrangement and mode of action of environmental sensors of the motor vehicle, the sensor data of which are used in the at least partially autonomous driving operation, during at least partially autonomous driving operation of the motor vehicle. The display device can be augmented reality glasses, an augmented reality contact lens, virtual reality glasses, or a display device which can be installed in the motor vehicle. The latter can be for example a contact-analog display device. Advantageous embodiments of the method described herein are to be considered advantageous embodiments of the display device described herein and vice versa, wherein the display device includes features for carrying out the method operations.

One advantageous embodiment of the display device provides that the display device has a data interface for wirelessly receiving data from the motor vehicle, which characterize the arrangement and mode of action of the environmental sensors of the motor vehicle. The interface can be, for example, a radio module, by use of which a communication is possible between motor vehicle and display device via Bluetooth or, for example, WLAN. It is particularly simple via the interface to transmit the data from the motor vehicle, which characterize the arrangement and mode of action of the environmental sensors of the motor vehicle, to the display device. For example, if it is a mobile display device, for example augmented reality data glasses or the like, the display device does not first have to be wired or connected in a wired manner to the motor vehicle in a complex manner in order to be able to receive the data.

The motor vehicle described herein is designed to drive at least partially autonomously and includes a data interface for wirelessly transmitting data to the above-mentioned display device, wherein the data characterize an arrangement and mode of action of environmental sensors of the motor vehicle, the sensor data of which are used by the motor vehicle in the at least partially autonomous driving operation.

Further advantages, features, and details are described in the following description of example embodiments and on the basis of the drawing. The features and feature combinations mentioned above in the description and the features and feature combinations mentioned hereinafter in the description of the drawing and/or shown solely in the drawing are usable not only in the respective specified combination but also in other combinations or alone, without leaving the scope of the disclosure.

BRIEF DESCRIPTION OF THE DRAWING

These and other aspects and advantages will become more apparent and more readily appreciated from the following description of example embodiments, taken in conjunction with the accompanying single drawing which is a schematic illustration of a motor vehicle in which a vehicle occupant wearing augmented reality glasses is seated, by use of which an arrangement and mode of action of environmental sensors of the motor vehicle are visualized.

DETAILED DESCRIPTION

Reference will now be made in detail to examples which are illustrated in the accompanying single drawing, wherein like reference characters refer to like elements.

A motor vehicle 1 is shown in a schematic illustration in the single drawing. A vehicle occupant 2 wearing augmented reality glasses 3 is seated in the motor vehicle 1. The motor vehicle 1 includes multiple environmental sensors 4, which are only indicated schematically, and a vehicle-side data interface 5 for wirelessly transmitting data to the augmented reality glasses 3, wherein the data characterize an arrangement and mode of action of the environmental sensors 4 of the motor vehicle 1, the sensor data of which are used by the motor vehicle 1 in the partially autonomous and fully autonomous driving operation. The augmented reality glasses 3 also have a data interface (not shown in greater detail here), which can communicate wirelessly with the data interface 5 of the motor vehicle 1 in order to receive the data.

As soon as the motor vehicle 1 drives partially autonomously or fully autonomously, both the arrangement and also the mode of action of the environmental sensors 4 of the motor vehicle 1 are visualized by use of the augmented reality glasses 3. For example, by use of the augmented reality glasses 3, a respective positioning of the environmental sensors 4 on the motor vehicle 1 is indicated. If the vehicle occupant 2 looks forward through the augmented reality glasses 3, he thus has the position of the front environmental sensor 4 identified, for example, via a corresponding virtual symbol, which is overlaid by use of the augmented reality glasses 3.

If the vehicle occupant 2 looks to the rear by turning his head, he thus has, for example, the positioning of the rear environmental sensor 4 identified in turn by another symbol. Moreover, the augmented reality glasses 3 can also identify respective detection ranges 6 of the environmental sensors 4. If the vehicle occupant 2 looks forward through a windshield of the motor vehicle 1, the augmented reality glasses 3 thus overlay the detection range 6, so that the vehicle occupant 2 can recognize when looking forward how far the environmental sensor 4 can look forward and detect the vehicle environment (surroundings), for example. This also applies for the rear environmental sensor 4.

Of course, the motor vehicle 1 can also have further environmental sensors (not shown here), which detect and cover, for example, a lateral environmental region of the motor vehicle 1. A respective sensor action principle of the environmental sensors 4 can also be visualized by use of the augmented reality glasses 3. For example, if the environmental sensors 4 are radar sensors, animated radar waves can thus be visualized by use of the augmented reality glasses 3. These are displayed by use of the augmented reality glasses 3, for example, so that they identify the detection range 6. Alternatively, it is also possible that the detection range 6 is overlaid as a type of cone, wherein the radar waves are additionally also displayed. Moreover, it can also be provided that the radar waves which are reflected back from a vehicle-external object to the relevant environmental sensor 4 designed as a radar sensor are visualized by use of the augmented reality glasses 3.

The vehicle occupant 2 can thus, by use of the augmented reality glasses 3, have the environmental sensors 4 required for partially or fully autonomous driving displayed spatially correctly located while driving. Moreover, it is also possible to have the mode of action identified in the visual representation, and also it is conveyed by use of continuing animations in the outside region of the motor vehicle 1 how the motor vehicle 1 processes the present sensor data and converts it into the partially autonomous or fully autonomous driving movement.

Above all, it can also be provided that the visualization of the arrangement and mode of action of the environmental sensors 4 of the motor vehicle 1 is automatically started as soon as the motor vehicle 1 changes from a manual driving mode into a partially autonomous or fully autonomous driving mode.

The above-explained functionality is not only restricted to the augmented reality glasses 3. Instead of the augmented reality glasses 3, for example, augmented reality contact lenses, virtual reality glasses, or greatly varying display devices, which are installed in the motor vehicle 1, can also be used. In the latter case, for example contact-analog display devices can be very helpful. Thus, for example, a contact-analog head-up display can be used to visualize the arrangement and mode of action of the environmental sensors 4. Contact-analog devices are a special form of augmented reality. The overlaid items of information fuse with the surroundings here. The overlaid items of information appear in the correct perspective at the location to which they each refer and quasi-adhere to objects in the environment. It is thus possible by use of contact-analog vehicle-side display devices to visualize the arrangement and mode of action of the environmental sensors 4 of the motor vehicle 1 even without aids to be additionally worn.

Overall, the feeling of safety in vehicle occupants 2 during partially autonomous or fully autonomous driving is improved by the explained method, since vehicle occupants 2 can recognize both the arrangement and also the mode of action of the environmental sensors 4 of the motor vehicle 1, the sensor data of which are used during the partially autonomous or fully autonomous driving operation.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for operating a motor vehicle, the method comprising:

during an at least partially autonomous driving operation of the motor vehicle using sensor data of environmental sensors of the motor vehicle to perform the at least partially autonomous driving operation, visualizing, by use of at least one display device arranged in the motor vehicle, an arrangement and a mode of action in sensorially recognizing an environment by the environmental sensors to visually indicate for a vehicle occupant, respective positions of the environmental sensors on the motor vehicle, and respective detection ranges of the environmental sensors, so that the mode of action in sensorially recognizing the environment by the environmental sensors is visually recognizable by the vehicle occupant.

2. The method according to claim 1, wherein the at least one display device includes augmented reality glasses, an augmented reality contact lens, virtual reality glasses, or a display device of the motor vehicle.

3. The method according to claim 2, wherein
the at least one display device includes the display device of the motor vehicle, and
the display device of the motor vehicle includes a contact-analog display device.

4. The method according to claim 1, wherein visualizing, by use of the at least one display device arranged in the motor vehicle, the arrangement and mode of action in sensorially recognizing an environment by the environmental sensors, includes indicating a principle method of operation of the environmental sensors.

5. The method according to claim 1, wherein
the environmental sensors include a radar sensor, and
visualizing, by use of the at least one display device arranged in the motor vehicle, the arrangement and mode of action in sensorially recognizing an environment by the environmental sensors of the motor vehicle, includes displaying animated radar waves of the radar sensor.

6. The method according to claim 5, wherein visualizing, by use of the at least one display device arranged in the motor vehicle, the arrangement and mode of action in sensorially recognizing an environment by the environmental sensors of the motor vehicle, further includes displaying animated radar waves which are reflected back from a vehicle-external object to the radar sensor.

7. The method according to claim 1, wherein visualizing, by use of the at least one display device arranged in the motor vehicle, the arrangement and mode of action in sensorially recognizing an environment by the environmental sensors of the motor vehicle, is automatically started in response to the motor vehicle changing from a manual driving operation into the at least partially autonomous driving operation.

8. A display device, arrangeable in a motor vehicle, comprising:
a memory to store instructions; and
a processor configured to execute the instructions to, during an at least partially autonomous driving operation of the motor vehicle using sensor data of environmental sensors of the motor vehicle to perform the at least partially autonomous driving operation, visualize an arrangement and mode of action in sensorially recognizing an environment by the environmental sensors to visually indicate for a vehicle occupant,
respective positions of the environmental sensors on the motor vehicle, and
respective detection ranges of the environmental sensors, so that the mode of action in sensorially recognizing the environment by the environmental sensors is visually recognizable by the vehicle occupant.

9. The display device according to claim 8, further comprising a data interface configured to wirelessly receive data from the motor vehicle, the data characterizing the arrangement and mode of action in sensorially recognizing the environment by the environmental sensors.

10. The display device according to claim 8, wherein the display device includes augmented reality glasses, an augmented reality contact lens, virtual reality glasses, or a display device installed in the motor vehicle.

11. The display device according to claim 10, wherein
the display device is installed in the motor vehicle, and
the display device includes a contact-analog display device.

12. The display device according to claim 8, wherein the processor is configured to visualize the arrangement and mode of action in sensorially recognizing an environment by the environmental sensors of the motor vehicle, by indicating a principle method of operation of the environmental sensors.

13. The display device according to claim 8, wherein
the environmental sensors include a radar sensor, and
the processor is configured to visualize the arrangement and mode of action in sensorially recognizing an environment by the environmental sensors of the motor vehicle, by displaying animated radar waves of the radar sensor.

14. The display device according to claim 13, wherein the processor is configured to visualize the arrangement and mode of action in sensorially recognizing an environment by the environmental sensors of the motor vehicle, by displaying animated radar waves which are reflected back from a vehicle-external object to the radar sensor.

15. The display device according to claim 8, wherein the processor is configured to automatically start visualizing the arrangement and mode of action in sensorially recognizing an environment by the environmental sensors of the motor vehicle, in response to the motor vehicle changing from a manual driving operation into the at least partially autonomous driving operation.

16. A motor vehicle, configured to perform an at least partially autonomous driving operation, the motor vehicle comprising:
environmental sensors of the motor vehicle configured to output sensor data which are used in the at least partially autonomous driving operation of the motor vehicle; and
a data interface configured to wirelessly transmit, based on the sensor data output by the environmental sensors, data to a display device, the data characterizing an arrangement and mode of action in sensorially recognizing an environment by the environmental sensors to visually indicate for a vehicle occupant on the display device,
respective positioning of the environmental sensors of the motor vehicle, and
respective detection ranges of the environmental sensors, so that the mode of action in sensorially recognizing the environment by the environmental sensors is visually recognizable by the vehicle occupant.

17. The motor vehicle according to claim 16, wherein the display device is a contact-analog display device.

18. The motor vehicle according to claim 17, wherein the display device is configured to automatically visually indicate the respective positioning of the environmental sensors on the motor vehicle, and the respective detection ranges of the environmental sensors, in response to the motor vehicle changing from a manual driving operation into the at least partially autonomous driving operation.

* * * * *